United States Patent
Lang

(10) Patent No.: US 9,590,455 B2
(45) Date of Patent: Mar. 7, 2017

(54) WIRELESS CHARGING SYSTEM

(71) Applicant: Robert Bosch GmbH, Stuttgart (DE)

(72) Inventor: Christoph Lang, Sunnyvale, CA (US)

(73) Assignee: Robert Bosch GmbH, Stuttgart (DE)

( * ) Notice: Subject to any disclaimer, the term of this patent is extended or adjusted under 35 U.S.C. 154(b) by 149 days.

(21) Appl. No.: 14/313,367

(22) Filed: Jun. 24, 2014

(65) Prior Publication Data
US 2015/0002080 A1    Jan. 1, 2015

Related U.S. Application Data

(60) Provisional application No. 61/839,618, filed on Jun. 26, 2013.

(51) Int. Cl.
| | | |
|---|---|---|
| *H02J 7/00* | (2006.01) | |
| *H02J 17/00* | (2006.01) | |
| *H02J 3/14* | (2006.01) | |

(52) U.S. Cl.
CPC ............ *H02J 17/00* (2013.01); *H02J 7/0068* (2013.01); *H02J 2003/143* (2013.01); *Y02B 70/3266* (2013.01); *Y04S 20/242* (2013.01)

(58) Field of Classification Search
CPC ................................ H02J 17/00; H02J 7/0068
USPC ......................................................... 320/107
See application file for complete search history.

(56) References Cited

U.S. PATENT DOCUMENTS

| | | | |
|---|---|---|---|
| 7,853,241 B1 * | 12/2010 | Harrison ............... | G06F 19/327 455/406 |
| 2008/0051043 A1 | 2/2008 | Greene et al. | |
| 2009/0102292 A1 | 4/2009 | Cook et al. | |
| 2010/0090656 A1 | 4/2010 | Shearer et al. | |
| 2010/0201189 A1 | 8/2010 | Kirby et al. | |
| 2012/0045303 A1 * | 2/2012 | Macdonald ............. | A47F 10/00 414/373 |
| 2012/0068611 A1 * | 3/2012 | Steiner ............... | H05B 37/0272 315/155 |
| 2012/0248891 A1 * | 10/2012 | Drennen ................. | H02J 5/005 307/104 |
| 2013/0110318 A1 | 5/2013 | Colja et al. | |
| 2013/0278164 A1 * | 10/2013 | Su ...................... | H05B 37/0245 315/201 |

FOREIGN PATENT DOCUMENTS

| | | | | |
|---|---|---|---|---|
| CN | 203039391 U | * | 11/2012 | ............. H02J 17/00 |
| WO | 2008/016527 A2 | | 2/2008 | |
| WO | 2009140221 A2 | | 11/2009 | |

OTHER PUBLICATIONS

International Search Report and Written Opinion corresponding to PCT Application No. PCT/US2014/044071, mailed Oct. 13, 2014 (14 pages).

* cited by examiner

*Primary Examiner* — Vuthe Siek
(74) *Attorney, Agent, or Firm* — Maginot Moore & Beck LLP

(57) ABSTRACT

A wireless power transmission system includes a first power transmitter configured to transmit a first electromagnetic field, a first power receiver configured to generate electrical energy using the first transmitted electromagnetic field, a first occupancy sensor configured to indicate a first presence of a first individual within a first sensed area, and a control unit configured to control the first power transmitter based upon the indicated first presence.

19 Claims, 4 Drawing Sheets

WIRELESS CHARGING SYSTEM

This application claims the benefit of U.S. Provisional Application No. 61/839,618 filed Jun. 26, 2013, the entire contents of which are incorporated herein by reference.

TECHNICAL FIELD

This disclosure relates generally to power transfer systems, and, more particularly, wireless charging systems.

BACKGROUND

Use of wireless sensors is rapidly increasing in residential, commercial, and industrial applications. For example, wireless sensors are used in alarm systems for residential and commercial buildings, for wireless temperature monitoring, and to detect occupancy in rooms. Buildings incorporating temperature and occupancy detection sensors, also known as "smart" buildings, can automatically control climate systems and lighting within the building.

Using wireless sensors for building applications enables simple retrofitting of buildings without the need for wiring electrical power to the sensors. However, wireless sensors are typically powered by a battery, which can power the sensor only for a limited duration. Replacing or recharging the batteries in wireless sensors can be cumbersome. One solution is to charge the wireless sensors remotely using electromagnetic energy, for example electromagnetic waves in the radio frequency band, also referred to as radio frequency ("RF") charging. In an RF charging system, a power transmitter broadcasts energy, which is received by an antenna and converted into electric power to charge the batteries in the attached sensor.

Although RF power transmission is designed to satisfy safety regulations, some people perceive the RF electromagnetic radiation as hazardous to human health. What is needed, therefore, are improvements in RF power transmission that reduce the potential for exposure to RF electromagnetic radiation.

SUMMARY

In one embodiment, a wireless power transmission system includes a first power transmitter configured to transmit a first electromagnetic field, a first power receiver configured to generate electrical energy using the first transmitted electromagnetic field, a first occupancy sensor configured to indicate a first presence of a first individual within a first sensed area, and a control unit configured to control the first power transmitter based upon the indicated first presence.

In another embodiment, a method of operating a wireless power transmission system includes indicating a first presence of a first individual within a first sensed area using a first occupancy sensor, receiving the indication of the first presence of the first individual at a control unit, controlling with the control unit a first power transmitter based upon the received first indication, transmitting a first electromagnetic field with the first power transmitter under the control of the control unit, and generating electrical power from the first electromagnetic field with a first power receiver.

DETAILED DESCRIPTION

For the purposes of promoting an understanding of the principles of the embodiments described herein, reference is now made to the drawings and descriptions in the following written specification. No limitation to the scope of the subject matter is intended by the references. This disclosure also includes any alterations and modifications to the illustrated embodiments and includes further applications of the principles of the described embodiments as would normally occur to one skilled in the art to which this document pertains.

Figure 1:
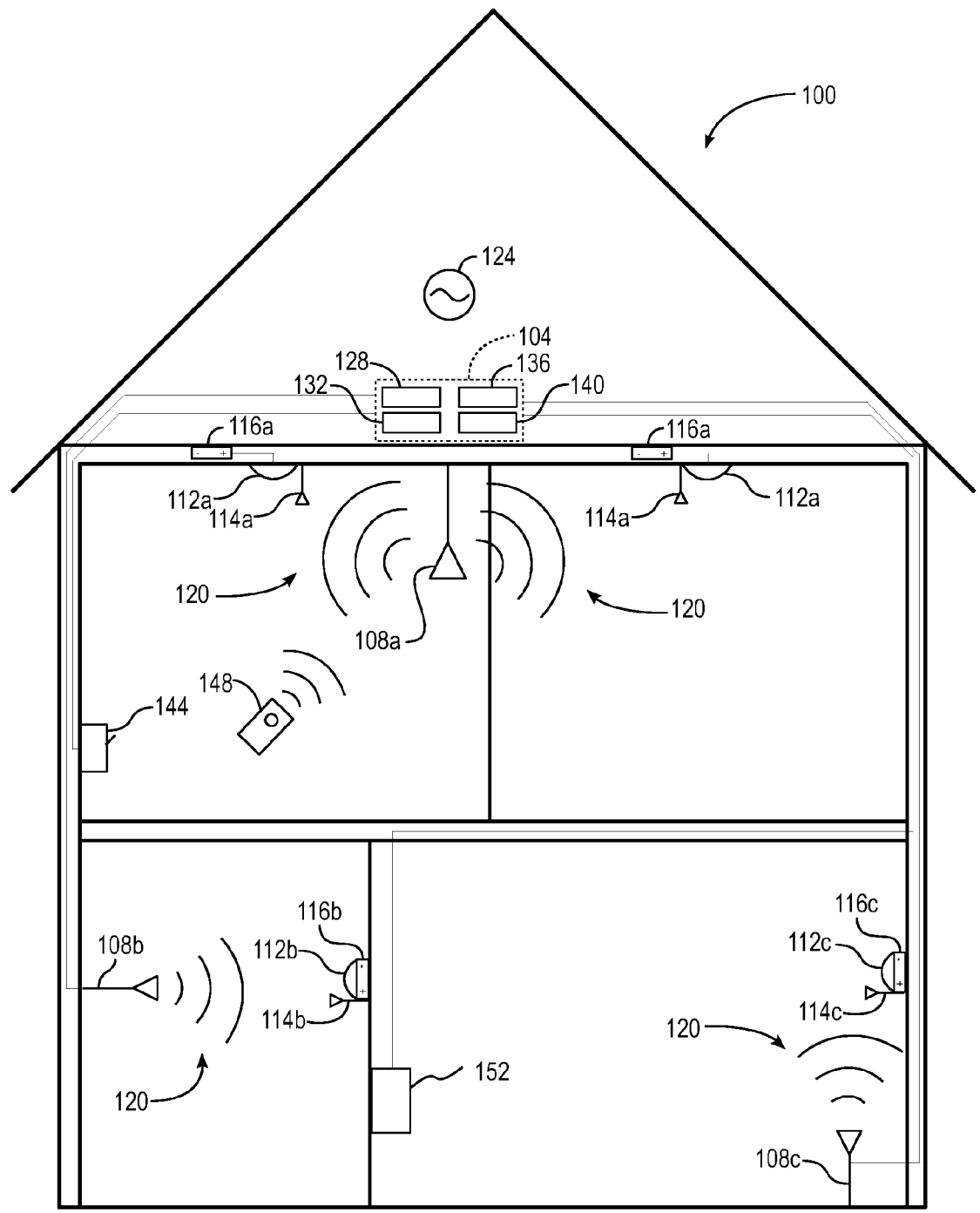
FIG. 1 is a schematic diagram of a building equipped with a wireless charging system having a control unit configured to selectively activate power transmitters.

FIG. 1 depicts a schematic diagram of a place or asset such as a building, a residential house, a garage, a hotel, a factory, a hospital, a mall, or the like equipped with a wireless charging system 100. In another embodiment, the asset can be a moving vessel such as a vehicle, a truck, a plane, a boat, a ship, or the like. The wireless charging system 100 includes a control unit 104, at least one power transmitter, and at least one wireless device (e.g. sensor or actuator), each of which is operatively connected to an energy storage system/device/cell such as a battery. In the illustrated embodiment, the system 100 includes three power transmitters 108a, 108b, and 108c and four sensors 112a, 112b, and 112c, which are connected to batteries 116a, 116b, and 116c, respectively. The power transmitters 108a-108c are each configured to generate an electromagnetic field 120. In the illustrated embodiment, the power transmitters 108a-108c are radio-frequency ("RF") antennas, though other power transmitters, such as inductive resonance loops or magnetic antennas, are used in other embodiments.

The sensors 112a-112c include occupancy sensors configured to detect whether a person occupies the room in which the sensors 112a-112c are mounted and to generate a corresponding signal. The signals generated by the occupancy sensors are delivered to the control unit 104 via a wireless signal transmitter, three wireless signal transmitters 114a-114c are illustrated, which transmit the signals via a known wireless signal transmission standard, for example Bluetooth, WiFi, Zigbee, TransferJet, UWB, NFC, EnOcean, dedicated short-range communication (DSRC), or RF signal transmission. In some embodiments, a wired connection or power line communication through wired receptacles is used to transmit the signals. The sensors 112a-112c each include a power receiver configured to receive electromagnetic radiation 120 generated by the power transmitters 108a-108c and convert the electromagnetic radiation 120 to electric power that charges the batteries 116a-116c. In some embodiments, the sensors 112a-112c include additional sensors, for example temperature sensors, alarm sensors, thermal sensors, motion sensors, optical sensors, camera sensors, atmosphere sensors, and resistive sensors. In other embodiments, the sensors 112a-112c are connected directly to a building power source via, for example, a wired receptacle, while the wireless power transmitters 108a-108c are configured to deliver power to charge batteries connected to other sensors and electronic components in the building. In other embodiments, more than one sensor is connected to a shared power receiver to receive electromagnetic radiation generated by one or more power transmitters 108a-108c. In further embodiments, the sensors, power receivers, power transmitters, or any combination thereof can be mounted, embedded, or integrated in any asset structures such as a ceiling, a wall, a window, a door, a floor, a roof, or the like.

The control unit 104 is operatively connected to a power source 124 to receive electric power from the power source 124. In the illustrated embodiment, the power source 124 is AC power wired to the building in which the wireless charging system 100 is installed. In other embodiments, the power source is a battery, a generator, a solar receiver, or any other suitable source of electric power. The power source can be mounted, embedded, or integrated in any asset structures such as a ceiling, a wall, a window, a door, a floor, a roof, or the like. The control unit 104 includes a controller 128, a memory unit 132, a timer 136, and an optional web server 140. The control unit 104 is operatively connected to the power transmitters 108a-108c to enable the control unit 104 to selectively activate the power transmitters 108a-108c.

The control unit 104 is operatively connected to a switch 144 to enable a user to manually activate and deactivate the power transmitters 108a-108c. In some embodiments, the switch 144 is positioned on one of the power transmitters 108a-108c or a separate switch is positioned on each power transmitter 108a-108c, while in other embodiments the switch 144 or switches are remote from the power transmitters 108a-108c. In different embodiments, the wireless charging system 100 includes a remote control 148 that enables a user to selectively activate any or all of the power transmitters 108a-108c or change operating parameters of the wireless charging system 100. In various embodiments, the control unit 104 is operatively connected to a building control system 152, which operates, for example, lighting, climate control, and an alarm system in the building. In other embodiments, the control unit 104 is integrated with the building control system 152. In further embodiments, the control unit 104 is integrated into the power transmitter.

Operation and control of the various components and functions of the wireless charging system 100 are performed with the aid of the controller 128. The controller 128 is implemented with general or specialized programmable processors that execute programmed instructions. The instructions and data required to perform the programmed functions are stored in the memory unit 132 associated with the control unit 104. The processors, the memory 132, and interface circuitry configure the controller 128 to perform the functions described above and the processes described below. These components can be provided on a printed circuit card or provided as a circuit in an application specific integrated circuit (ASIC). Each of the circuits can be implemented with a separate processor or multiple circuits can be implemented on the same processor. Alternatively, the circuits can be implemented with discrete components or circuits provided in VLSI circuits. Also, the circuits described herein can be implemented with a combination of processors, ASICs, discrete components, or VLSI circuits.

In operation, the control unit 104 is configured to selectively activate any or all of the power transmitters 108a-108c to generate the electromagnetic field 120. The sensors 112a-112c each have a power receiving antenna that absorbs the electromagnetic energy 120 and converts the energy into electric power, which is used to charge the batteries 116a-116c connected to the sensors 112a-112c, respectively. In another embodiment, the sensors are configured to connect to a shared power receiving antenna.

The timer 136 is configured to recall a program stored in memory 128 such that the control unit 104 activates any or all of the power transmitters 108a-108c only at predetermined times. The timer 136 is programmed by the remote control 148, by manual input, or by a computer or smartphone connected to the timer 136 via the web server 140. To minimize exposure to the electromagnetic radiation, the timer 136 is preferably set such that the control unit 104 activates the power transmitters 108a-108c only when the room in which they are located is typically unoccupied, for example at night in offices or during work hours in a residence.

The web server 140 connects the control unit 104 to an electronic device such as a computer, a smartphone, a tablet, a gaming console, a laptop, or the like via internet protocol ("IP"). In some embodiments, the web server 140 is a local server, connected only to a local area network, while in other embodiments the web server is connected to the internet, enabling the control unit 104 to be programmed and controlled remotely from any internet-connected computer or smartphone. The web server can also be in a remote place and control the power transmitters via a connection, for example an IP connection.

The memory 132 of the control unit 104 stores the programming instructions for the timer 136 and for the controller 128. Additionally, the control unit 104 generates a log, which is stored in the memory 132, to record the times when each of the power transmitters 108a-108c are active. A user can then access the log via the web server 140 to monitor the human exposure to the electromagnetic radiation.

In the illustrated embodiment, the wireless charging system 100 includes three power transmitters 108a-108c. Wireless power transmitter 108a is configured to transmit power to two wireless sensors 112a, located in different rooms of the building when the rooms are unoccupied. Wireless power transmitters 108b and 108c generate a lower strength electromagnetic field 120, and are configured to transmit power only within a single room to sensors 112b and 112c, respectively, when the associated occupancy sensor detects that the room in which it is located is unoccupied. In some embodiments, the wireless charging system includes a single wireless power transmitter, which generates an electromagnetic field strong enough to be received by all sensors throughout the building. In such a system, the control unit can be configured to activate the wireless power transmitter only when the sensors indicate that the entire building is unoccupied or nearly unoccupied.

Figure 2:
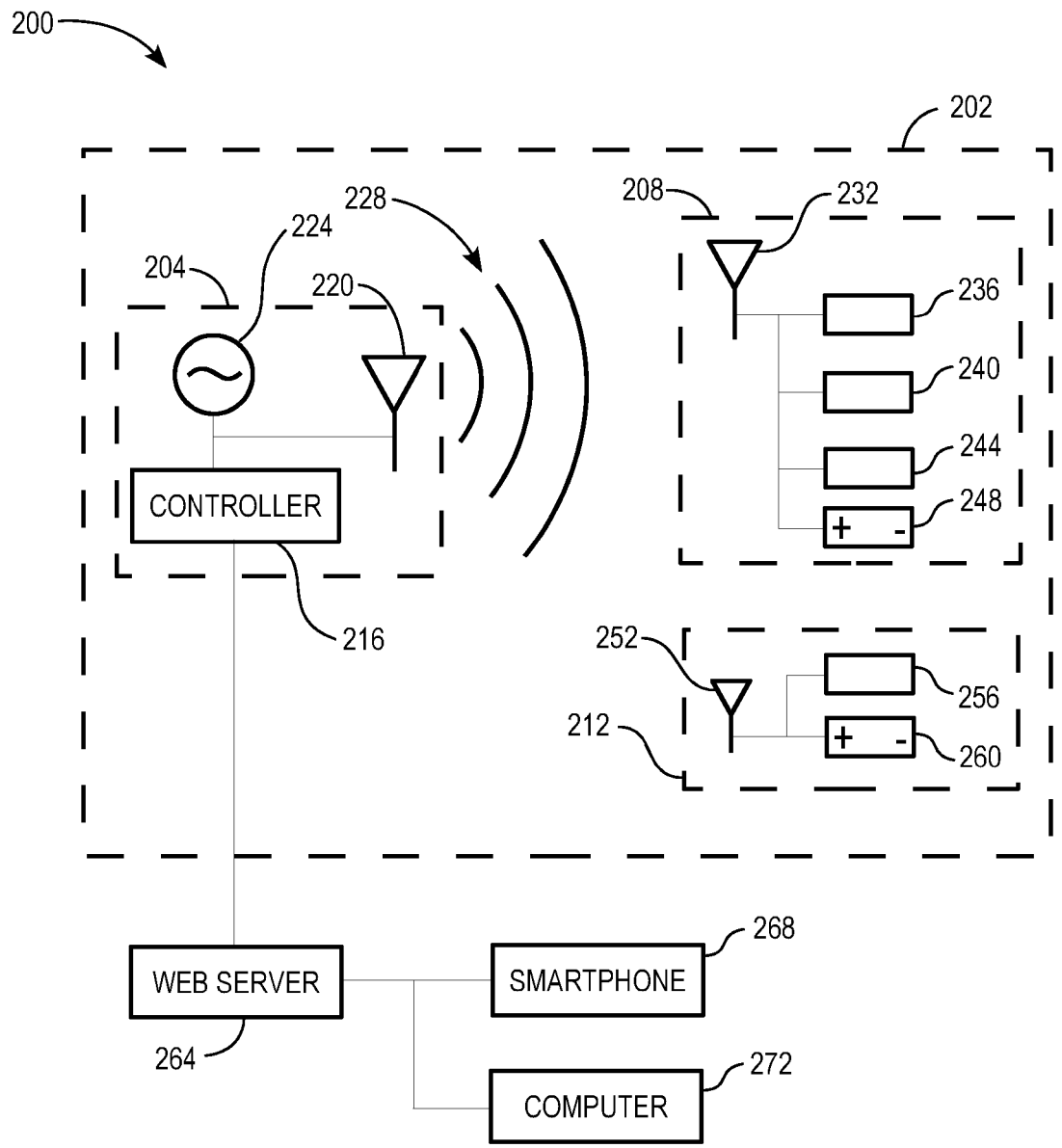
FIG. 2 is a schematic diagram of another wireless charging system having a control unit connected to a web server.

FIG. 2 is a schematic illustration of another embodiment of a wireless charging system 200. The wireless charging system 200 includes a power transmission system 204, a receiving system 208, and an occupancy sensor system 212, which, in the illustrated embodiment, are all located in a single room 202.

The power transmission system 204 includes a control unit 216 and a power transmitter 220, both of which are operatively connected to a power source 224. The control unit 216 is configured to selectively activate the power transmitter 220 to emit electromagnetic energy 228 into the room 202, directed towards the receiving system 208 and the occupancy sensor system 212.

The receiving system 208 includes a power receiver 232, at least one sensor, for example an alarm sensor 236 and a temperature sensor 240, emergency lighting 244, and an energy storage system/device/cell such as a battery 248. The power receiver is configured to receive the electromagnetic energy 228 generated by the power transmitter 220 and convert the received energy into electric power to charge the battery 248. The battery 248 is operatively connected to the sensors 236 and 240 and the lighting 244 to enable the sensors 236 and 240 and the lighting 244 to operate with the energy stored in the battery 248.

The occupancy sensor system 212 includes an optional power receiver 252, an occupancy sensor 256, and a battery 260. In alternate embodiments, the occupancy sensor system is powered by a wired connection to a power supply. The power receiver 252 receives the electromagnetic energy 228 generated by the power transmitter 220 and converts the received energy to electrical energy to charge the battery 260, which powers the occupancy sensor 256. The occupancy sensor 256 is configured to detect the presence of a person in the room 202, and to generate a corresponding signal, which is delivered to the control unit 216. In some embodiments, the power receiver 252 is configured to transmit the sensor signal to the power transmitter, while in other embodiments other known wired or wireless signal transmission systems are used to transmit the sensor signal to the control unit.

The control unit 216 is optionally connected to a web server 264, which is remote of the power transmission system 204. The web server 264 is configured to be controlled by an electronic device such as a smartphone 268, a computer 272, a tablet, a gaming console, a laptop, or the like to enable a user to remotely select operating parameters for activating the power transmitter 224 and to manually activate or deactivate the transmitter 224. In some embodiments, the web server 264 operates a plurality of wireless charging systems, each located in a different room of an asset such as a building or building complex. Each wireless charging system can be programmed to operate independently of the others.

In other embodiments the web server can be implemented on the power transmission system 204.

In some embodiments, the control unit 216 is configured to selectively activate the wireless power transmitter 220 based on the sensor signals received from the occupancy sensor 212. If the sensor signal indicates that the room 202 is unoccupied, the control unit 216 activates the power transmitter 220 to generate electromagnetic energy 228, which is received by the power receivers 232 and 252 to charge the batteries 248 and 256, respectively. If the control unit 216 receives a sensor signal indicating that the room 202 is occupied, the control unit 216 deactivates the power transmitter 220, thereby minimizing exposure of occupants of the room 202 to the electromagnetic energy 228.

Figure 3:
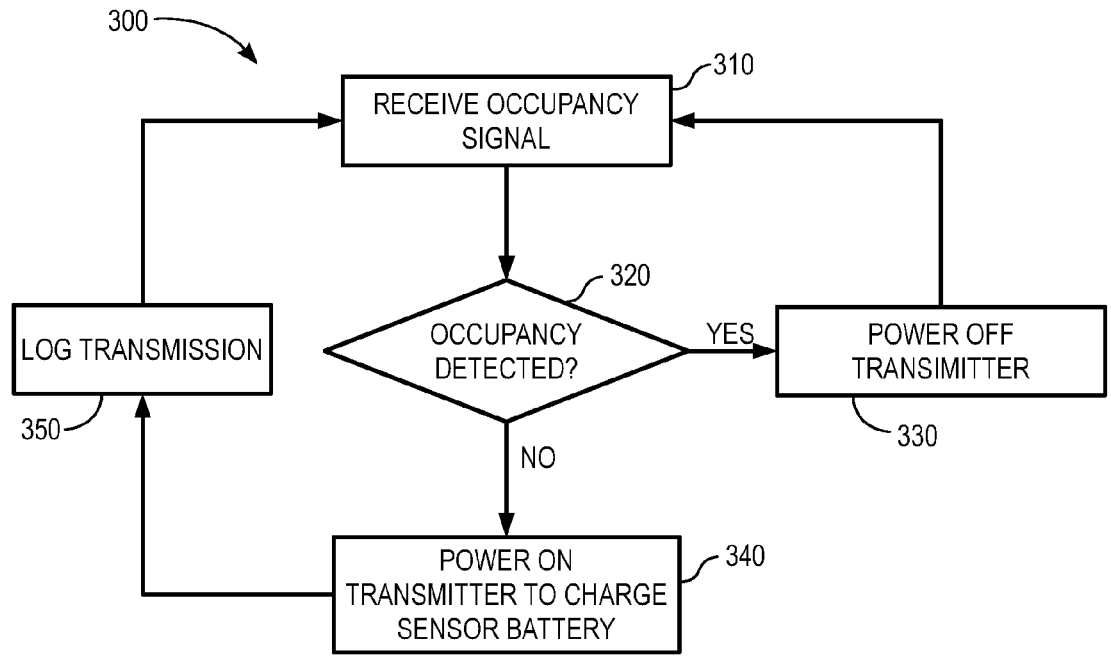
FIG. 3 is a flow diagram of a process for selectively operating a wireless power transmitter.

FIG. 3 illustrates a process 300 for operating a wireless charging system, such as the wireless charging systems of FIG. 1 and FIG. 2. The process 300 refers to a controller, such as the controller 128 and the control unit 216 described above, executing programmed instructions stored in a memory, for example memory 132, operatively connected to the controller to cause the controller to operate one or more components of the system to perform the specified function or action described in the process.

The process begins with the controller receiving an occupancy signal from an occupancy sensor (block 310). In some embodiments, the occupancy signal is localized to an individual room or area of a building, while in other embodiments the occupancy signal is indicative of occupancy in any portion of the building in which the system is installed. The controller then determines if occupancy is detected in the room or building (block 320). If the asset, such as the room or building, is occupied, the wireless power transmitter is deactivated (block 330), thereby minimizing exposure of occupants to electromagnetic radiation, and the process continues from block 310. If the room or building is unoccupied, the controller activates the wireless power transmitter (block 340) to enable the batteries of the occupancy sensors and other wireless electronic devices to charge without risking occupant exposure to electromagnetic radiation. In some embodiments, the controller is further configured to record when the power transmitter is active (block 350) in a log that is stored in a memory, to enable a user to recall the times during which the power transmitter is active. The process then continues from block 310.

Figure 4:
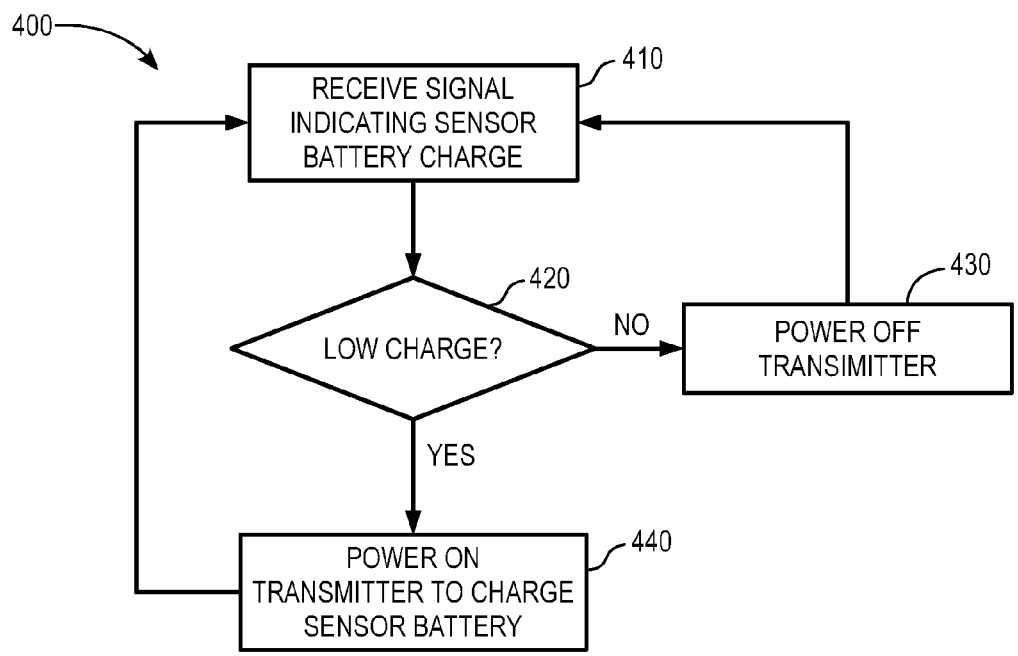
FIG. 4 is a flow diagram of another process for selectively operating a wireless power transmitter.

FIG. 4 illustrates another process 400 for operating a wireless charging system. The process 400 refers to a controller, such as the controller 128 and the control unit 216 described above, executing programmed instructions stored in a memory, for example memory 132, operatively connected to the controller to cause the controller to operate one or more components of the system to perform the specified function or action described in the process.

The process 400 begins with the controller receiving a signal indicating a level of charge in a battery that operates a sensor or other electronic component (block 410). The controller determines whether the level of charge is below a threshold value, indicating that the battery has a low charge (block 420). If the charge is above the threshold value, the power transmitter is deactivated (block 430) and the process continues with block 410. If the charge is below the threshold value, the power transmitter is activated to enable the battery to be charged (block 440), and the process repeats from block 410. The power transmitter therefore emits electromagnetic radiation only when the batteries in the system are in need of charging, thus reducing the amount of time the power transmitter is active, and lowering the occupant exposure accordingly.

Figure 5:
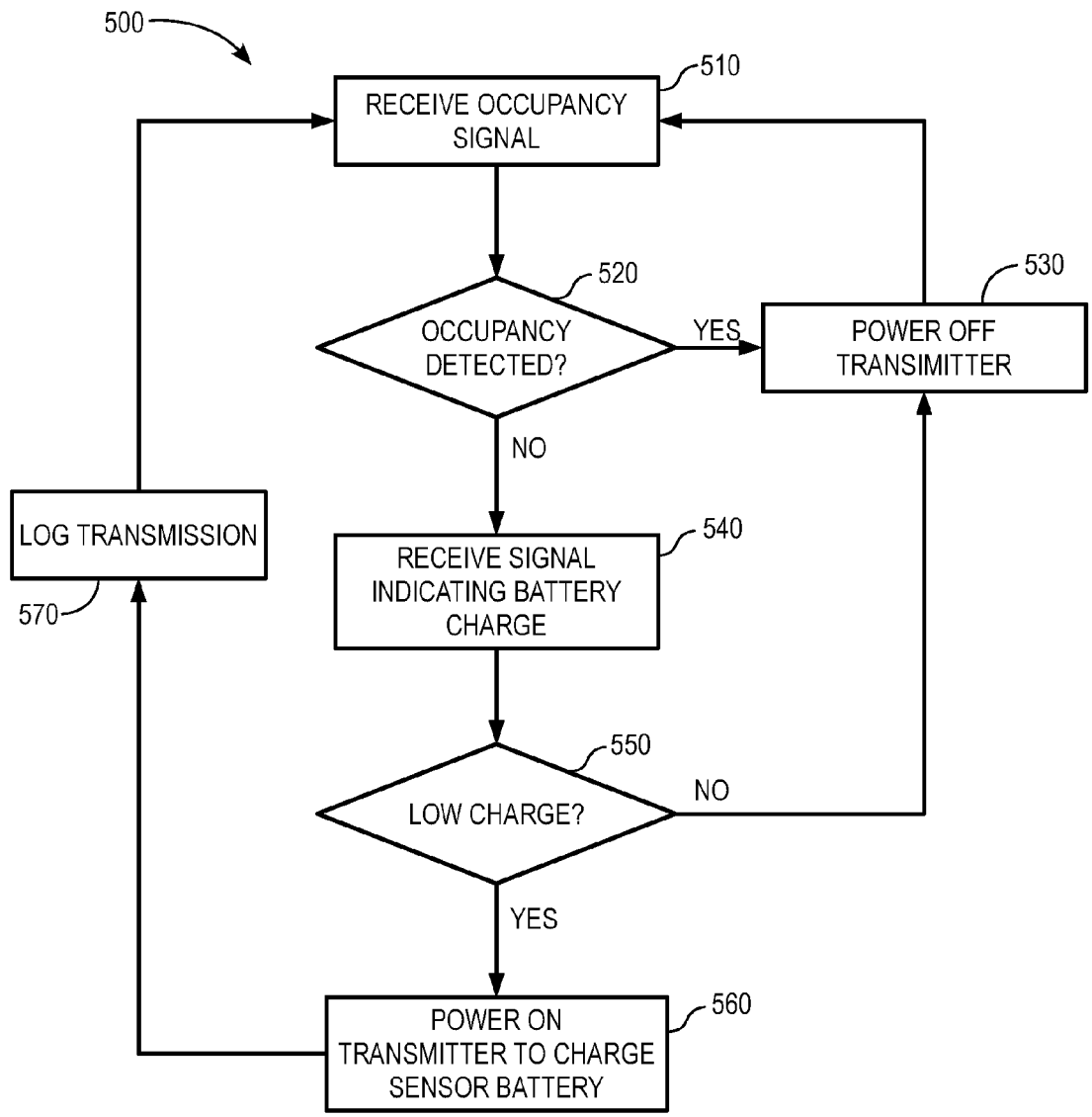
FIG. 5 is a flow diagram of yet another process for selectively operating a wireless power transmitter.

FIG. 5 illustrates another process 500 for operating a wireless charging system, such as the wireless charging systems of FIG. 1 and FIG. 2. The process 500 refers to a controller, such as the controller 128 and the control unit 216 described above, executing programmed instructions stored in a memory, for example memory 132, operatively connected to the controller to cause the controller to operate one or more components of the system to perform the specified function or action described in the process.

The process 500 begins with the controller receiving an occupancy signal from an occupancy sensor located in an asset, which may be for example, a room or a building (block 510). The controller then determines if occupancy is detected in the asset (block 520). If the asset is occupied, the wireless power transmitter is deactivated (block 530), thereby minimizing exposure of occupants to electromagnetic radiation, and the process continues from block 510. If the room or building is unoccupied, the controller then receives a signal indicating a level of charge in a battery that operates a sensor or other electronic component (block 540). The controller determines whether the level of charge is below a threshold value, indicating that the battery has a low charge (block 550). In one embodiment, the threshold value is approximately 98% of the full charge of the battery, though other threshold values are used in alternate embodiments. If the charge is above the threshold value, the power transmitter is deactivated (block 530) to reduce power consumption by the power transmitter, and the process continues with block 510. If the charge is below the threshold value, the power transmitter is activated to enable the battery to be charged (block 560) without risking occupant exposure to electromagnetic radiation. The controller is further configured to record when the power transmitter is active (block 570) in a log that is stored in a memory, to enable a user to recall the times during which the power transmitter is active. The process then continues from block 510.

The power transmitter therefore emits electromagnetic radiation only when the area in which the power transmitter is installed is unoccupied and the batteries in the system are in need of charging. Occupant exposure is reduced since the power transmitter is active when the area of the power transmitter is unoccupied. Furthermore, the cost of operation is reduced since the power transmitter is not active when the batteries are fully or nearly fully charged.

It will be appreciated that variants of the above-described and other features and functions, or alternatives thereof, may be desirably combined into many other different systems, applications or methods. Various presently unforeseen or unanticipated alternatives, modifications, variations or improvements may be subsequently made by those skilled in the art that are also intended to be encompassed by the foregoing disclosure.

What is claimed is:

1. A wireless power transmission system comprising:
   a first power transmitter configured to transmit a first electromagnetic field;
   a first power receiver configured to generate electrical energy using the first transmitted electromagnetic field;
   a first occupancy sensor configured to indicate a first presence of a first individual within a first sensed area;
   a second power transmitter operatively connected to the control unit and configured to transmit a second electromagnetic field;
   a second occupancy sensor configured to indicate a second presence of a second individual within a second sensed area; and
   a control unit operably connected to the first power transmitter, the first occupancy sensor, the second power transmitter, and the second occupancy sensor, the control unit being configured to control the first power transmitter based upon the indicated first presence and to control the second power transmitter based upon the indicated second presence.

2. The system of claim 1, wherein the control unit is configured to deactivate the first power transmitter upon indication of the first presence of the first individual and to deactivate the second power transmitter upon indication of the second presence of the second individual.

3. The system of claim 1, wherein:
   the first power transmitter is configured to transmit the first electromagnetic field in a first room;
   the first sensed area is in the first room;
   the second power transmitter is configured to transmit the second electromagnetic field in a second room; and
   the second sensed area is in the second room.

4. The system of claim 1, wherein:
   the first power transmitter is configured to receive power from a first wired receptacle;
   the first occupancy sensor is configured to receive power from a second wired receptacle; and
   the first occupancy sensor is configured to indicate the first presence of the first individual through the second wired receptacle and the first wired receptacle.

5. The system of claim 4 further comprising:
   a wireless signal transmitter operatively connected to the second occupancy sensor and configured to wirelessly transmit a signal to the control unit based upon the indicated second presence.

6. A wireless power transmission system comprising:
   a first power transmitter configured to transmit a first electromagnetic field;
   a first power receiver configured to generate electrical energy using the first transmitted electromagnetic field;
   a first occupancy sensor configured to indicate a first presence of a first individual within a first sensed area;
   an energy storage device operatively connected to the first power receiver and the first occupancy sensor, the energy storage device configured to store the generated electrical energy and to supply the stored electrical energy to the first occupancy sensor; and
   a control unit operably connected to the first power transmitter and configured to control the first power transmitter based upon the indicated first presence.

7. The system of claim 6 further comprising:
   a wireless signal transmitter operatively connected to the first occupancy sensor and configured to wirelessly transmit a signal to the control unit based upon the indicated first presence.

8. The system of claim 6 further comprising:
   at least one electronic component operatively connected to the energy storage device and configured to receive stored electrical energy from the energy storage device.

9. The system of claim 8, wherein the at least one electronic component includes at least one component selected from the group consisting of a temperature sensor, an alarm sensor, a thermal sensor, a motion sensor, an optical sensor, a camera, an atmosphere sensor, a resistive sensor, and a light.

10. The system of claim 6, wherein the control unit includes a remote management system configured to enable a user to remotely manage operating parameters for the control unit.

11. The system of claim 10, wherein the remote management system includes a web server.

12. A method of operating a wireless power transmission system, comprising:
    indicating a first presence of a first individual within a first sensed area using a first occupancy sensor;
    receiving the indication of the first presence of the first individual at a control unit;
    controlling with the control unit a first power transmitter based upon the received first indication;
    transmitting a first electromagnetic field with the first power transmitter under the control of the control unit;
    generating electrical power from the first electromagnetic field with a first power receiver;
    storing the generated electrical energy in an energy storage device operatively connected to the first power receiver and the first occupancy sensor; and
    supplying the stored electrical energy to the first occupancy sensor.

13. The method of claim 12 further comprising:
    deactivating the first power transmitter with the control unit upon indication of the first presence of the first individual.

14. The method of claim 12 further comprising:
    indicating a second presence of a second individual within a second sensed area using a second occupancy sensor;
    receiving the indication of the second presence of the second individual at the control unit;

controlling with the control unit a second power transmitter based upon the received second indication;
transmitting a second electromagnetic field with the second power transmitter under the control of the control unit; and
generating electrical power from the second electromagnetic field with a second power receiver.

15. The method of claim 14, wherein:
the first power transmitter is configured to transmit the first electromagnetic field in a first room;
the first sensed area is in the first room;
the second power transmitter is configured to transmit the second electromagnetic field in a second room; and
the second sensed area is in the second room.

16. The method of claim 14, further comprising:
receiving power at the second power transmitter from a first wired receptacle;
receiving power at the second occupancy sensor from a second wired receptacle; and
indicating the second presence of the second individual through the second wired receptacle and the first wired receptacle.

17. The method of claim 12 further comprising:
wirelessly transmitting a signal to the control unit based upon the indicated first presence with a wireless signal transmitter operatively connected to the first occupancy sensor.

18. The method of claim 12 further comprising:
supplying the stored electrical energy to at least one electronic component operatively connected to the energy storage device.

19. The method of claim 12 further comprising:
deactivating the first power transmitter with the control unit in response to a charge level of the energy storage device being greater than a predetermined threshold.

* * * * *